United States Patent
Freeth (10) Patent No.: US 9,676,495 B2
(45) Date of Patent: Jun. 13, 2017

(54) HYDRANT COUPLER WITH ARTICULATING HANDLE ASSEMBLY

(71) Applicant: Eaton Corporation, Cleveland, OH (US)

(72) Inventor: Gilbert Peter Freeth, San Dimas, CA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/776,156

(22) PCT Filed: Mar. 14, 2014

(86) PCT No.: PCT/US2014/028041
§ 371 (c)(1),
(2) Date: Sep. 14, 2015

(87) PCT Pub. No.: WO2014/143881
PCT Pub. Date: Sep. 18, 2014

(65) Prior Publication Data
US 2016/0039538 A1 Feb. 11, 2016

Related U.S. Application Data (60) Provisional application No. 61/788,548, filed on Mar. 15, 2013.

(51) Int. Cl.
*F16L 37/00* (2006.01)
*B64F 1/28* (2006.01)
(Continued)

(52) U.S. Cl.
CPC .............. *B64F 1/28* (2013.01); *F16L 37/127* (2013.01); *F16L 37/138* (2013.01)

(58) Field of Classification Search
USPC .............................................. 285/38, 311, 312
See application file for complete search history.

(56) References Cited

U.S. PATENT DOCUMENTS 397,187 A * 2/1889 Holton et al. .......... F16L 37/20
285/311
969,019 A * 8/1910 Wilson et al. .......... F16L 37/20
285/311
(Continued)

FOREIGN PATENT DOCUMENTS

DE 202008008692 U1 9/2008
FR 2882804 A1 9/2006

OTHER PUBLICATIONS

International Preliminary Report on Patentability for PCT Application No. PCT/US2014/028041, dated Sep. 15, 2015, 8 pages.
(Continued)

*Primary Examiner* — Aaron Dunwoody
(74) *Attorney, Agent, or Firm* — Benesch Friedlander Coplan & Aronoff LLP (57) ABSTRACT

A hydrant coupler (12) is disclosed that includes a coupler body (16), an actuating collar (20) movable relative to the coupler body (16) and a handle assembly (25) connected to the actuating collar (20). The handle assembly (25) includes an upper arm component (31) and a lower arm component (33) separated by a handle articulating feature (35) that connects the upper and lower arm components (31, 33), but permits relative motion therebetween.

15 Claims, 6 Drawing Sheets

(51) Int. Cl.
*F16L 37/127* (2006.01)
*F16L 37/138* (2006.01)

(56) References Cited

U.S. PATENT DOCUMENTS

| | | | | |
|---|---|---|---|---|
| 1,639,813 | A * | 8/1927 | Schawrow | F16L 37/16 |
| | | | | 285/148.19 |
| 2,482,175 | A * | 9/1949 | Hamilton, Jr. | F16L 37/16 |
| | | | | 285/312 |
| 3,059,206 | A * | 10/1962 | Williams | H01R 13/62933 |
| | | | | 285/18 |
| 3,278,205 | A * | 10/1966 | Barlow | F16L 37/1205 |
| | | | | 137/614 |
| 3,721,359 | A * | 3/1973 | Howell | A01D 41/1217 |
| | | | | 285/311 |
| 4,078,577 | A | 3/1978 | Brown | |
| 4,575,130 | A * | 3/1986 | Pemberton | F16L 37/18 |
| | | | | 141/349 |
| 5,535,984 | A * | 7/1996 | Anderson | F16L 37/18 |
| | | | | 251/149.9 |
| 6,062,609 | A * | 5/2000 | Chauvire | F16L 37/26 |
| | | | | 285/311 |
| 6,298,876 | B1 * | 10/2001 | Bogdonoff | F16L 37/18 |
| | | | | 137/614.04 |
| 6,505,861 | B2 * | 1/2003 | Butterfield | F16L 27/08 |
| | | | | 285/179 |
| 7,152,886 | B2 * | 12/2006 | Janis | F16L 37/127 |
| | | | | 285/311 |
| 8,006,713 | B2 | 8/2011 | Wong | |
| 8,403,369 | B2 * | 3/2013 | Chang | F16L 37/18 |
| | | | | 285/311 |
| 2011/0005639 | A1 | 1/2011 | Weh | |
| 2011/0095525 | A1 * | 4/2011 | Eich | F16L 37/18 |
| | | | | 285/312 |

OTHER PUBLICATIONS

International Search Report for PCT Application No. PCT/US2014/028041, dated Jul. 28, 2014, 5 pages.
Nritten Opinion of the International Searching Authority, for PCT Application No. PCT/US2014/028041, 7 pages.

* cited by examiner

HYDRANT COUPLER WITH ARTICULATING HANDLE ASSEMBLY

RELATED APPLICATIONS

This application is a U.S. National Stage of International Application No. PCT/US2014/028041, filed Mar. 14, 2014, which claims priority to U.S. Provisional Patent Application No. 61/885,548, filed on Mar. 15, 2013.

TECHNICAL FIELD

The disclosure relates to a hydrant coupler suitable for use in the aviation fueling industry. Specifically, the disclosure relates to a hydrant coupler with an articulating handle assembly.

BACKGROUND

In the aviation fueling industry, hydrant valves are installed in pit boxes below ground level and function both as a connection device and an on/off valve in the underground aviation fuel distribution system. A hydrant coupler is the other half of the connection system and controls fuel flow and fueling pressure during an aircraft refueling operation. In a typical connection system, the interface between the hydrant valve and the hydrant coupler is manually opened by the fueling operator using a handle on the hydrant coupler. When the hydrant coupler is opened, a face seal in the coupler engages a hydrant valve adapter to form a secure fuel flow path from the underground fuel pipes through the hydrant valve/coupler and into the aircraft.

To meet industry requirements, a secure latching mechanism is used to ensure that the hydrant coupler remains attached to the hydrant valve under all fueling pressures and flow. In one design, the latching mechanism utilizes an external actuating collar that drops in place under the force of gravity or a spring force to automatically latch the hydrant coupler to the hydrant valve. To disconnect the hydrant coupler, the fueling operator lifts the actuating collar to release the latching components. This type of actuating collar design presents a fuel leak risk should the interface seal fail during engagement and/or fuel flow. An interface seal failure would allow pressurized fuel leakage that may be sufficient to lift the collar and disengage the coupler. This disengagement may cause the hydrant valve poppet to quickly close and, in turn, create relatively high surge pressures within the hydrant valve sufficient to cause, among other things, a fuel spill.

To avoid fuel spills, hydrant couplers must be equipped with a lock mechanism that maintains the actuating collar in the connected position during connection and fueling. Hydrant couplers may include both short and long handle designs to accommodate various operational configurations. The long handle design, for example, allows the operator to disengage and lift the hydrant coupler away from the hydrant valve from a standing position. While the referenced hydrant coupler may be adequate for its intended purpose, there is still a need for a hydrant coupler that is both ergonomic, functional for its intended purpose and easily stored and/or transported between fueling operations.

SUMMARY

In one embodiment, a hydrant coupler includes a coupler body, an actuating collar movable relative to the coupler body, and a handle assembly connected to the actuating collar. The handle assembly may include an upper arm component and a lower arm component separated by a handle articulating feature. In one embodiment, the handle articulating feature includes a first slot sized to allow passage of a fastener, the fastener extending through the first slot and secured to the lower arm component in a manner that connects the upper and lower arm components, but permits relative motion therebetween and a second slot sized to allow passage of a pin that is secured to the lower arm component so that at least a portion of the pin extends through the second slot and movement of the upper arm component is guided by the interaction between the pin and the second slot.

The handle articulating feature may also include an upper locking portion and a lower locking portion disposed within the second slot, the upper locking portion and the lower locking portion configured to receive the pin such that when the actuating collar is in a lower position relative to the coupler body, the pin is received in the upper locking portion inhibiting relative motion between the upper and lower arm components and, when the actuating collar is lifted to an upper position relative to coupler body, the pin is received in the lower locking portion inhibiting relative motion between the upper and lower arm components.

Various aspects of the present disclosure will become apparent to those skilled in the art from the following detailed description of the embodiments, when read in light of the accompanying drawings.

BRIEF DESCRIPTION OF THE DRAWINGS

It will be appreciated that the illustrated boundaries of components in the figures represent one example of the boundaries. One of ordinary skill in the art will appreciate that one component may be designed as multiple components or that multiple components may be designed as a single component. Additionally, an internal component may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1:
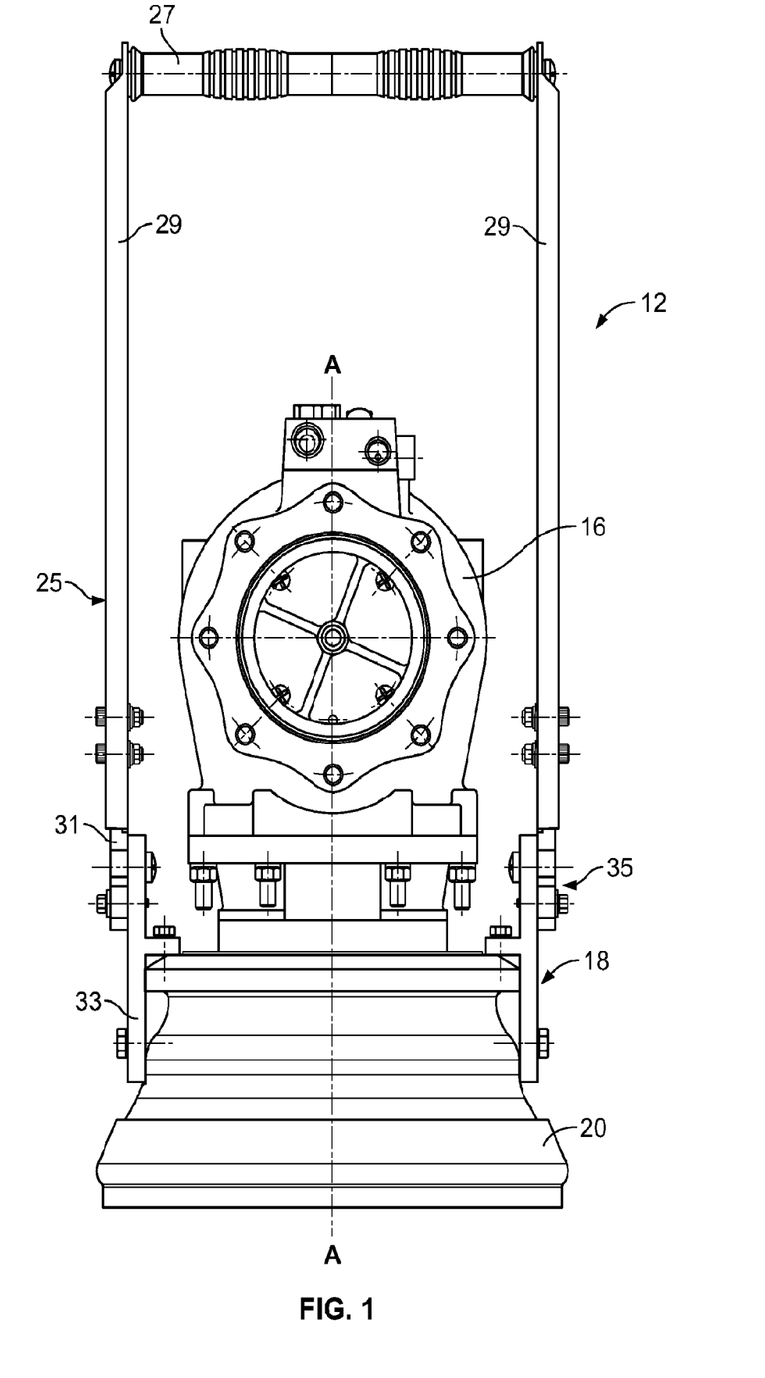
FIG. 1 is a front view of a hydrant coupler according to an embodiment of the present invention.

Referring to FIG. 1, a hydrant coupler 12 is shown. The construction and operation of the hydrant coupler 12 may be substantially similar to the hydrant coupler described in U.S. Pat. No. 8,006,713, which is owned by the assignee of the present invention and incorporated by reference herein in its entirety. In an embodiment of the present invention, hydrant coupler 12 includes a coupler body 16 having an axis A-A and a coupler actuating collar assembly 18 having an actuating collar 20 that is movable axially relative to the coupler body 16. The actuating collar 20 includes at least one movable latching feature (not shown) that is selectively placed around a mating feature on a hydrant valve (not shown) by lifting or lowering the actuating collar 20. When the actuating collar 20 is lifted, the latching feature moves into the unlatched position disconnecting the hydrant coupler 12 from the hydrant valve and when the actuating collar 20 is lowered, the latching feature moves to the latched position connecting the hydrant coupler 12 to the hydrant valve.

Referring still to FIG. 1, the hydrant coupler 12 also includes a handle assembly 25 connected to the actuating collar assembly 18 to facilitate axial movement thereof. In an embodiment, the handle assembly 25 may be configured to be gripped manually or include features that enable automated handling of the hydrant coupler 12, such as by robotic operation. For example, as shown in the illustrated embodiment, the handle assembly 25 may include a handle 27 connected to the actuating collar assembly 18 by a pair of extension arms 29. Extension arms 29 may be configured to include an upper arm component 31 and a lower arm component 33 separated by a handle articulating feature 35. Together, the upper and lower arm components 31, 33 and the handle articulating feature 35 form an articulating handle assembly.

Figure 2:
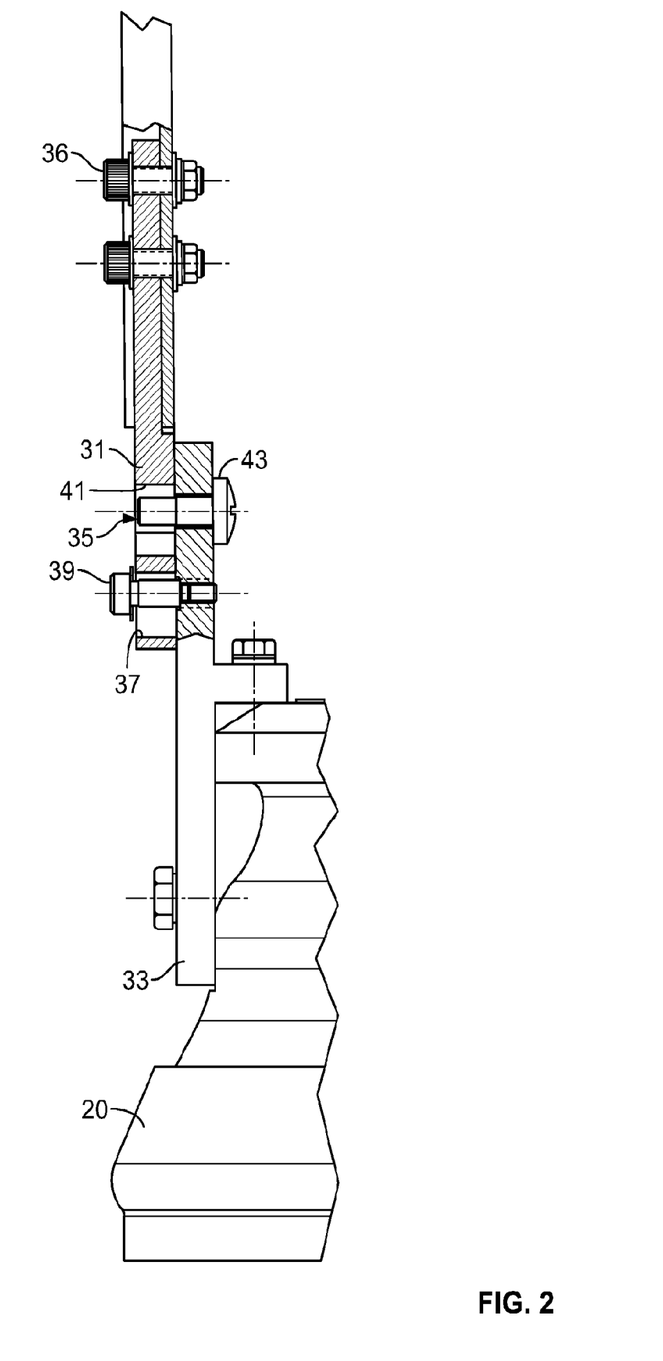
FIG. 2 is a partial cross-sectional view of the hydrant coupler of FIG. 1 according to an embodiment of the present invention.

As shown in the embodiment illustrated in FIG. 2, a portion of the handle articulating feature 35 may be secured to or made integral with the upper arm component 31. For example, as shown in FIG. 2, the handle articulating feature 35 is attached to the upper arm component 31 using at least one fastener 36, such as a bolt, screw, rivet or similar feature. The handle articulating feature 35 includes an axially extending slot 37 sized to allow passage of a fastener 39, which extends through the slot 37 and is secured to the lower arm component 33 in a manner that connects the upper and lower arm components 31, 33, but permits relative motion (e.g., both axial and rotational) therebetween. The handle articulating feature 35 also includes a generally semi-circular or kidney shaped slot 41. A pin 43 is secured to the lower arm component 33 so that at least a portion of the pin 43 extends through the slot 41. In the embodiment shown in FIG. 2, the pin 43 includes a portion that is in threaded connection with the lower arm component 33.

Figure 3:
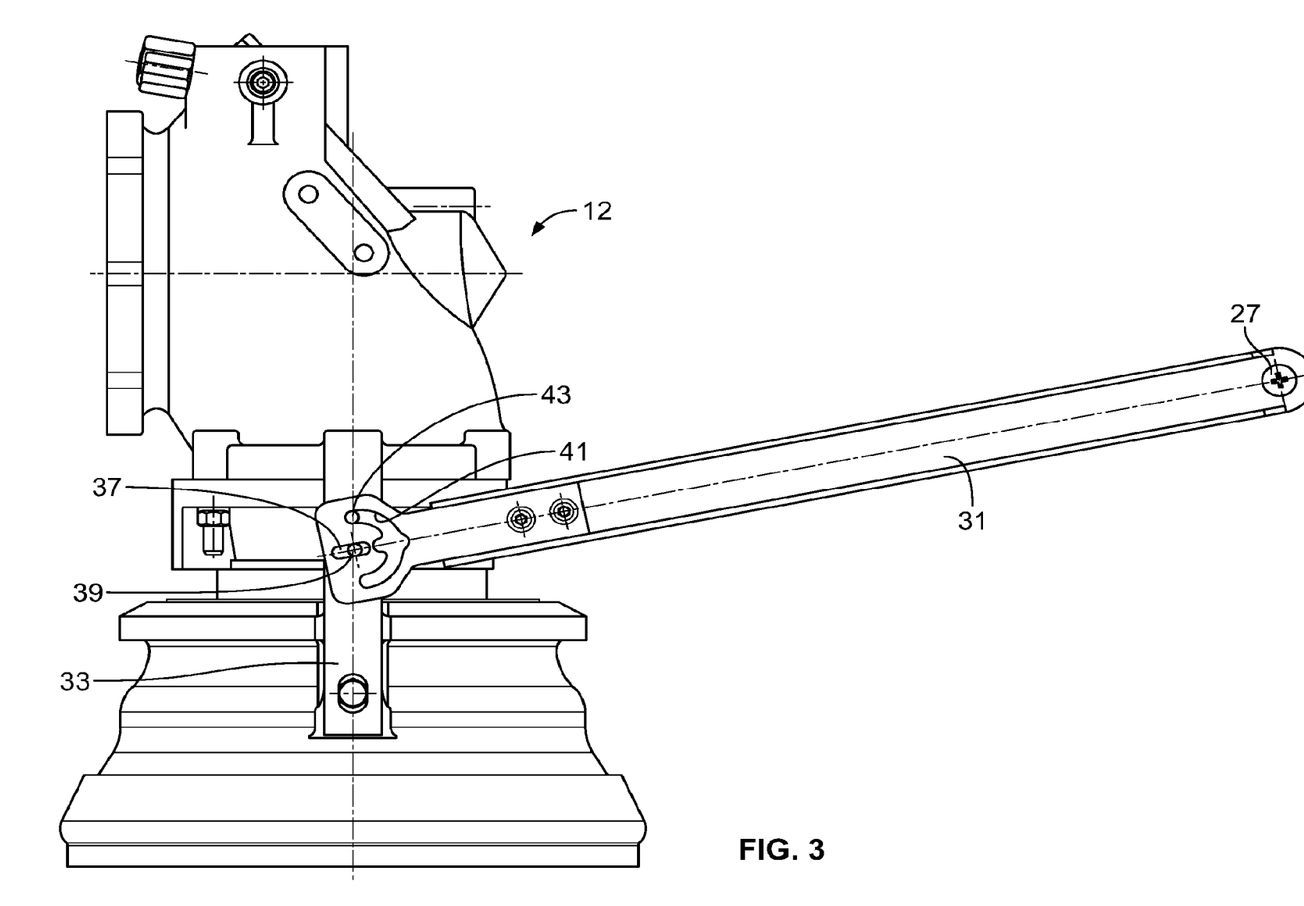
FIGS. 3 and 4 are side views of a hydrant coupler according to an embodiment of the present invention, showing a handle assembly in two articulated positions.
Figure 4:
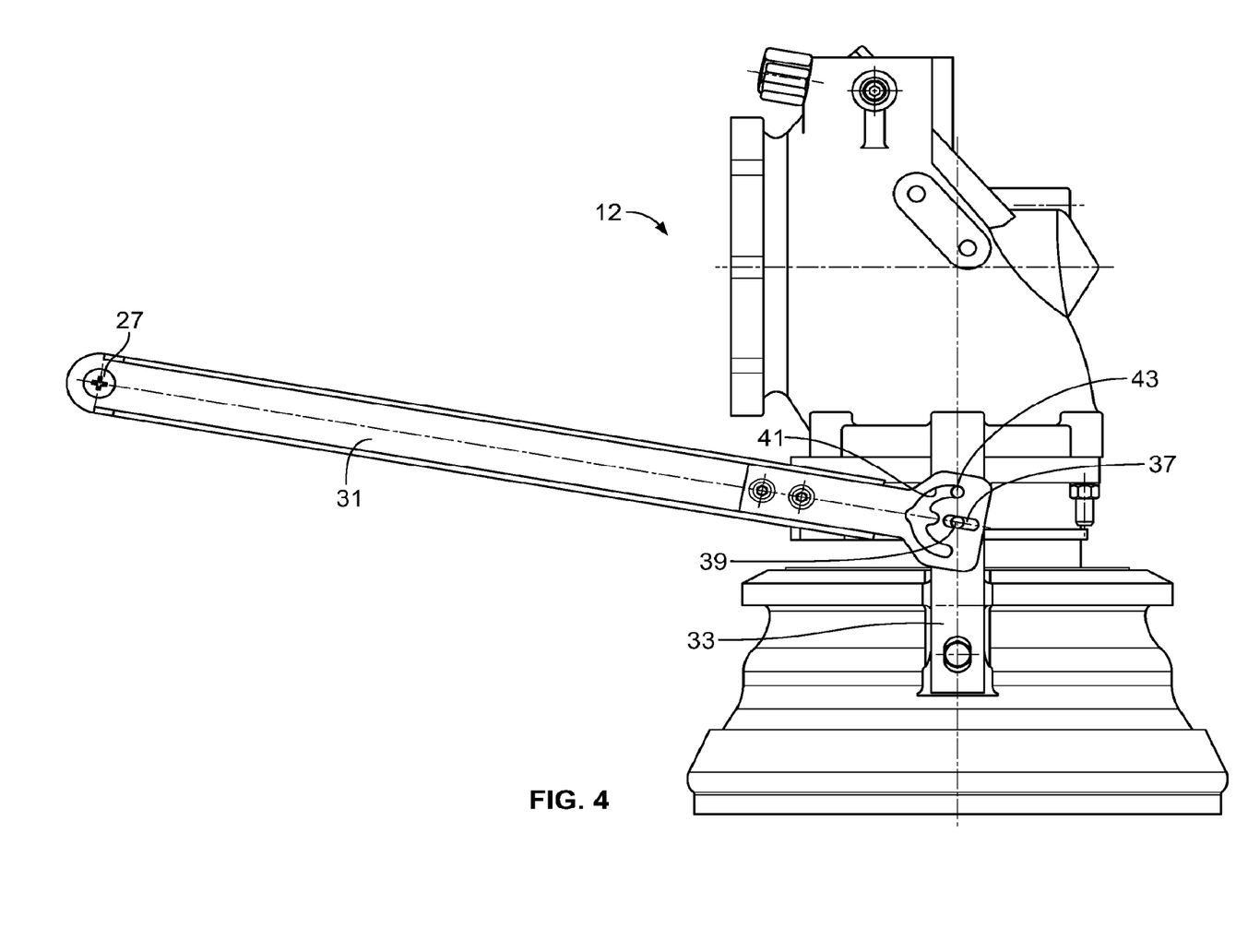

In operation, as the upper arm component 31 is moved relative to the lower arm component 33, movement of the handle 27 is guided by the interaction between the pin 43 and the slot 41. For example, in FIG. 3, movement of the handle 27 to the right in the figure is guided by the pin 43 interacting with the left half of the slot 41. Conversely, movement of the handle 27 to the left in FIG. 4 is guided by the pin 43 interacting with the right half of the slot 41. It will be appreciated that the slot 41 is not limited to the configuration described and illustrated herein and that the slot 41 may be configured with other shapes and dimensions to control the travel and positioning of the handle 27.

Figure 5:
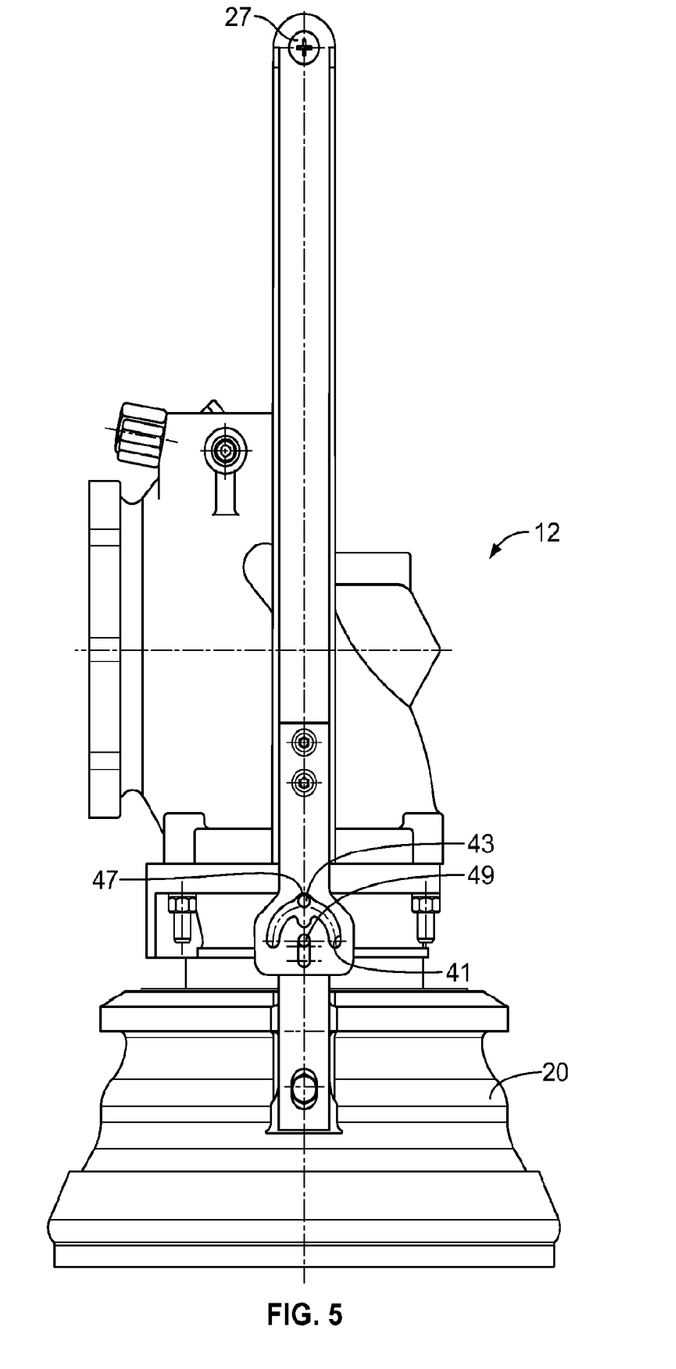
FIGS. 5 and 6 are side views of a hydrant coupler according to an embodiment of the present invention, showing a handle assembly in an actuation position and a transport position, respectively.
Figure 6:
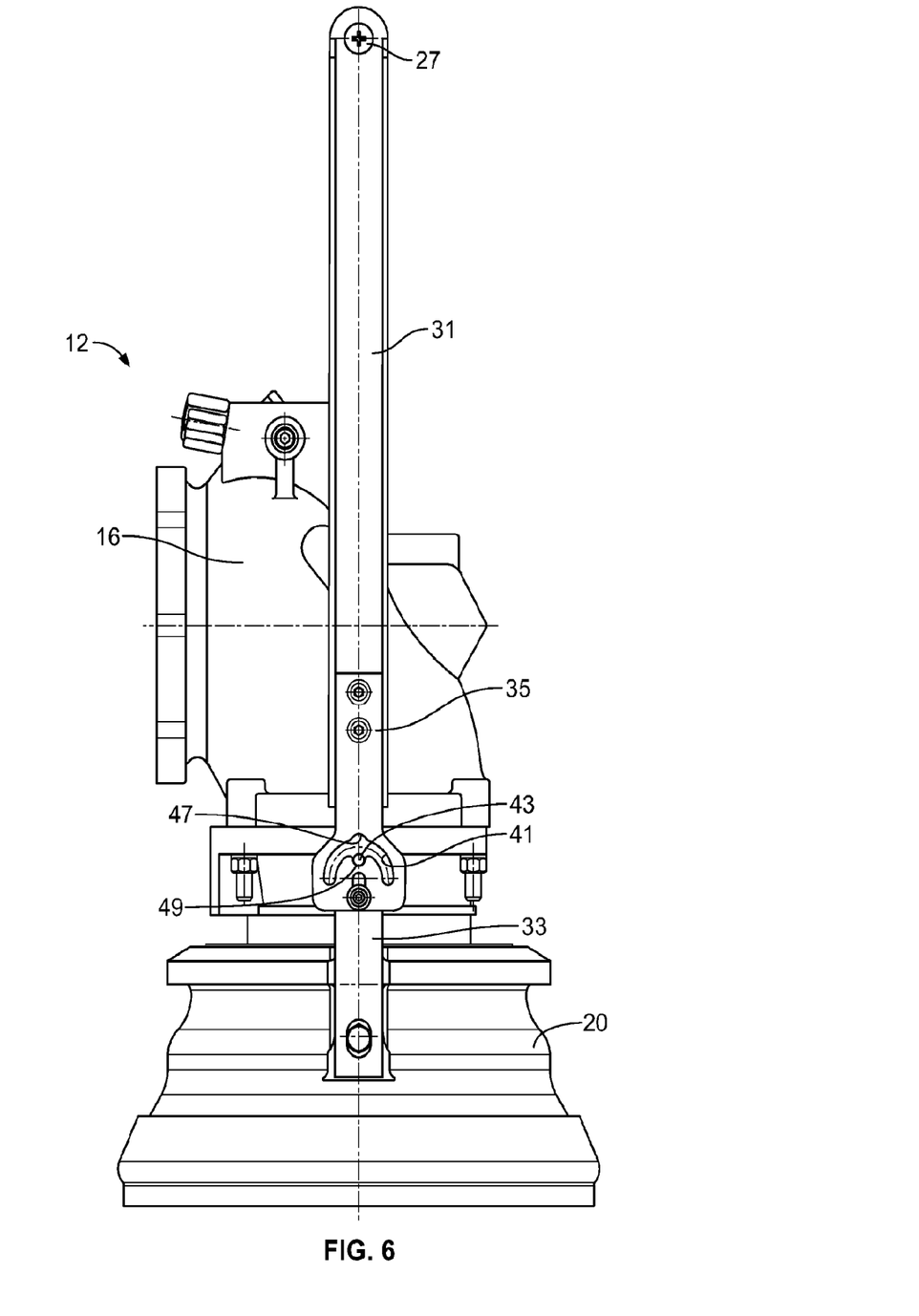

With further reference to FIGS. 5 and 6, the slot 41 also includes an upper locking portion 47 and a lower locking portion 49. During operation, after the hydrant coupler 12 is connected to the hydrant valve and the actuating collar 20 is in its lowered position relative to the coupler body 16 as shown in FIG. 5, the pin 43 is received in the upper locking portion 47 inhibiting relative motion between the upper and lower arm components 31, 33 and locking the handle assembly 25 in the upright actuation position during refueling. After the refueling is complete and the hydrant coupler 12 may be removed from the hydrant valve, the handle 27 is lifted causing the upper arm component 31 and the handle articulating feature 35 to move axially relative to the lower arm component 33 until the pin 43 is received in the lower locking portion 49 of the slot 41 as shown in FIG. 6. Further lifting of the handle 27 causes both the upper and lower arm components 31, 33 to move together, resulting in the actuating collar 20 being lifted to an upper position relative to the coupler body 16, the latching feature moving into the unlatched position and the hydrant coupler 12 being disconnected from the hydrant valve. Once disconnected, the pin 43 is received in the lower locking portion 49 of the slot 41 inhibiting relative motion between the upper and lower arm components 31, 33 and movement of handle 27 during transport of hydrant valve 12. After transport, the handle 27 may then be moved to a more convenient storage position shown in FIGS. 3 and 4 by axially moving the upper arm component 31 relative to the lower arm component 33 and allowing the pin 43 to align with the slot 41.

It will be appreciated that the above teachings are merely exemplary in nature and is not intended to limit the present teachings, their application or uses. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A hydrant coupler comprising:

a coupler body;

an actuating collar movable relative to the coupler body; and a handle assembly connected to the actuating collar, the handle assembly including an upper arm component and a lower arm component separated by a handle articulating feature, the handle articulating feature including:

a first slot sized to allow passage of a fastener, the fastener extending through the first slot and secured to the lower arm component in a manner that connects the upper and lower arm components, but permits relative motion therebetween; and a second slot sized to allow passage of a pin that is secured to the lower arm component so that at least a portion of the pin extends through the second slot and movement of the upper arm component is guided by the interaction between the pin and the second slot, wherein the second slot further comprises an upper locking portion and a lower locking portion, the upper locking portion and the lower locking portion configured to receive the pin such that when the actuating collar is in a lower position relative to the coupler body, the pin is received in the upper locking portion inhibiting relative motion between the upper and lower arm components and, when the actuating collar is lifted to an upper position relative to coupler body, the pin is received in the lower locking portion inhibiting relative motion between the upper and lower arm components.

2. The hydrant coupler of claim 1, wherein a portion of the handle articulating feature is removably secured to the upper arm component.

3. The hydrant coupler of claim 1, wherein a portion of the handle articulating feature is integral with the upper arm component.

4. The hydrant coupler of claim 1, wherein the second slot is generally semi-circular or kidney shaped.

5. The hydrant coupler of claim 1, wherein the actuating collar comprises at least one movable latching feature that is selectively placed around a mating feature on a hydrant valve by lifting or lowering the actuating collar.

6. A hydrant coupler comprising:
a coupler body;
an actuating collar movable relative to the coupler body; and
a handle assembly connected to the actuating collar, the handle assembly including an upper arm component and a lower arm component separated by a handle articulating feature that connects the upper and lower arm components, but permits relative motion therebetween;
wherein the handle articulating feature comprises a first slot sized to allow passage of a fastener, the fastener extending through the first slot and secured to the lower arm component in a manner that connects the upper arm component to the lower arm component, but permits relative motion therebetween;
wherein the handle articulating feature further comprises a second slot and the lower arm component comprises a pin, and wherein at least a portion of the pin extends through the second slot so that movement of the upper arm component is guided by the interaction between the pin and the second slot; and
wherein the second slot comprises an upper locking portion and a lower locking portion and wherein, when the actuating collar is in a lower position relative to the coupler body, the pin is received in the upper locking portion inhibiting relative motion between the upper and lower arm components and, when the actuating collar is lifted to an upper position relative to coupler body, the pin is received in the lower locking portion inhibiting relative motion between the upper and lower arm components.

7. The hydrant coupler of claim 6, wherein a portion of the handle articulating feature is removably secured to the upper arm component.

8. The hydrant coupler of claim 6, wherein a portion of the handle articulating feature is integral with the upper arm component.

9. The hydrant coupler of claim 6, wherein the second slot is generally semi-circular or kidney shaped.

10. The hydrant coupler of claim 6, wherein the actuating collar comprises at least one movable latching feature that is selectively placed around a mating feature on a hydrant valve by lifting or lowering the actuating collar.

11. A hydrant coupler comprising:
a coupler body;
an actuating collar movable relative to the coupler body; and
a handle assembly connected to the actuating collar, the handle assembly including an upper arm component and a lower arm component separated by a handle articulating feature that connects the upper and lower arm components, but permits relative motion therebetween;
wherein the handle articulating feature further comprises a slot and the lower arm component comprises a pin, and wherein at least a portion of the pin extends through the slot so that movement of the upper arm component is guided by the interaction between the pin and the slot; and
wherein the slot comprises an upper locking portion and a lower locking portion and wherein, when the actuating collar is in a lower position relative to the coupler body, the pin is received in the upper locking portion inhibiting relative motion between the upper and lower arm components and, when the actuating collar is lifted to an upper position relative to coupler body, the pin is received in the lower locking portion inhibiting relative motion between the upper and lower arm components.

12. The hydrant coupler of claim 11, wherein a portion of the handle articulating feature is removably secured to the upper arm component.

13. The hydrant coupler of claim 11, wherein a portion of the handle articulating feature is integral with the upper arm component.

14. The hydrant coupler of claim 11, wherein the slot is generally semi-circular or kidney shaped.

15. The hydrant coupler of claim 11, wherein the actuating collar comprises at least one movable latching feature that is selectively placed around a mating feature on a hydrant valve by lifting or lowering the actuating collar.

* * * * *